United States Patent [19]
Park et al.

[11] 4,268,313
[45] May 19, 1981

[54] SODIUM RESISTANT SEALING GLASSES

[75] Inventors: Dong-Sil Park, Clifton Park; Louis Navias, Schenectady, both of N.Y.

[73] Assignee: General Electric Company, Schenectady, N.Y.

[21] Appl. No.: 142,477

[22] Filed: Apr. 21, 1980

[51] Int. Cl.³ .............................................. C03C 3/08
[52] U.S. Cl. .................................................... 106/54
[58] Field of Search ......................................... 106/54

[56] References Cited

U.S. PATENT DOCUMENTS

| | | | |
|---|---|---|---|
| 3,477,863 | 11/1969 | Bromer et al. | 106/54 |
| 3,597,785 | 7/1971 | Bruce et al. | 106/54 |
| 3,669,698 | 6/1972 | Graff et al. | 106/54 |
| 3,946,751 | 3/1976 | Breiter et al. | 429/166 |
| 4,037,027 | 7/1977 | Desplanches et al. | 429/191 |
| 4,132,820 | 1/1979 | Mitoff | 428/65 |

Primary Examiner—O. R. Vertiz
Assistant Examiner—Mark Bell
Attorney, Agent, or Firm—Paul R. Webb, II; James C. Davis, Jr.

[57] ABSTRACT

Sodium resistant sealing glasses having borosilicate glass compositions in which glass stability is improved by the incorporation of several percent sodium oxide with a select percentage of the alkali earth oxides of calcium oxide, strontium oxide and barium oxide. The sodium oxide is present in the sealing glass compositions in a total weight percent range from 2 to 6 weight percent. Each of the alkali earth oxides is present in the glass compositions in the range from 2 to 8 weight percent with the total of the three oxides not exceeding 16 weight percent.

4 Claims, No Drawings

SODIUM RESISTANT SEALING GLASSES

This invention relates generally to sodium resistant sealing glasses and, more particularly, to such glasses with borosilicate glass compositions with several percent sodium oxide in combination with a specific percentage of the alkali earth oxides of calcium oxide, strontium oxide and barium oxide.

Such sodium resistant sealing glasses are useful for sealing a ceramic ring or flange to a solid electrolyte tube in a sodium-sulfur battery. Such a sodium-sulfer battery employing a sealing glass in this manner is described in U.S. Pat. No. 3,946,751 - Breiter et al., entitled "Cell Casing With a Hermetic Mechanical Seal and A Hermetically Sealed Sodium-Sulfur Cell". This patent is assigned to the same assignee as the present application.

The term solid electrolyte tube as used above in the discussion of a sodium-sulfur battery, includes ion-conductive materials such as beta-alumina, beta"-alumina, mixtures thereof and related compounds.

In the above mentioned U.S. Pat. No. 3,946,751 - Breiter et al., a cell casing and a hermetically sealed sodium-sulfur cell are disclosed and claimed wherein the cell casing includes a hermetic mechanical seal joining two opposed outer metallic casing portions to an electrically insulating ceramic ring supporting an inner casing of a solid ion-conductive material. The hermetically sealed sodium-sulfur cell has the above type of casing with a sodium negative electrode in the inner casing and a positive electrode of sulfur in conductive material in an outer casing portion surrounding the inner casing. A glass seal seals a portion of the outer wall of the inner casing of the solid sodium ion-conductive material adjacent its open end within and to the ceramic ring.

U.S. Pat. No. 4,132,820 issued Jan. 2, 1979, and entitled "Composite Body With Beta-Alumina Substrate and Glass Coating Thereon", assigned to the same assignee as the present invention, describes and claims a composite body with a glass coating which has sodium resistance, low alkali ion-conductance and a thermal expansion of 7.3 to $6.1 \times 10^{-6}$ inches/inch/°C. The glass coating compositions can be selected from the table set forth in column 3, the specific glass coatings set forth in column 3, or the table set forth in columns 3 and 4 of the above-mentioned patent. As opposed to the present invention, none of the glass coatings set forth in the above-identified patent recite a combination of modifying oxides of calcium oxide, strontium oxide and barium oxide in a permissible range of 6 to 16 total weight percent of the glass composition with 2 to 6 weight percent of sodium oxide. The unique combination of the modifying oxides of calcium oxide, strontium oxide, barium oxide with sodium oxide results in an improved sodium resistant sealing glass heretofore unknown as seals for sealing a ceramic ring or flange to a solid electrolyte tube in a sodium-sulfur battery and the like.

Our invention is directed to improved sodium resistant sealing glasses which contain a combination of modifying oxides in specific weight percent ranges to improve the stability of the sealing glasses.

The primary object of our invention is to provide improved sodium resistant sealing glasses which are useful to seal a ceramic ring or flange to a solid electrolyte tube in a sodium-sulfur battery.

In accordance with one aspect of our invention, sodium resistant sealing glasses have borosilicate glass compositions including mixtures of specific modifying alkali earth oxides for glass stability.

These and various other objects, features and advantages of the invention will be better understood from the following description:

Sodium-sulfur cells incorporate generally a sealing glass in the ceramic-to-ceramic seal between an electrically insulating flange and a solid ion-conductive electrolyte made generally of beta or beta"-alumina. During the active life of the cell, the sealing glass is in contact with molten sodium from the sodium compartment of the sodium-sulfur cell and, therefore, it must offer adequate resistance against sodium attack. Further, substantial changes in the sealing glass composition are liable to occur during the sealing of the flange to the electrolyte due to ionic interdiffusion between the glass and the ceramic component. This effect of change in glass composition is particularly serious at the glass-electrolyte interface. Our studies have indicated that such changes lead to glass devitrification and deleterious thermal expansion mismatches between sealed components with resulting seal failures and termination of cell operation.

We have found improved sodium resistant sealing glasses which offer stability against interfacial reactions and devitrification as well as good sodium resistance. Our sealing glasses have been selected from borosilicate compositions containing specific mixtures of alkali oxides. Ceramographic examinations of seals and results of seal tests for extended cycling periods of time and temperature indicated the excellent behavior of our improved sodium resistant sealing glasses.

Previously, silicate and borosilicate glasses have been used as sealing glasses in sodium-sulfur cells. For example, in U.S. Pat. No. 4,037,027, there is described a borosilicate glass of the composition having 70.36% $SiO_2$, 1.88% $Al_2O_3$, 19.56% $B_2O_3$ and 8.20% $Na_2O$. In the present invention the ratio of weight percent content of the oxides of calcium, strontium and barium to the weight percent content of the sodium oxide in the sealing glass composition is of critical importance. As recited in the Mitoff patent (U.S. Pat. No. 4,132,820), assigned to the same assignee as the present application, beta-alumina substrates may be coated with a glass composition containing the above mentioned constituents within certain prescribed ranges. For example, composition #3 for a glass coating as recited in the Mitoff patent at column 3, beginning with line 54 contains 17 weight percent silicon dioxide, 43 weight percent boron oxide, 10 weight percent alumina, 23 weight percent barium oxide, and 2 weight percent sodium oxide. This glass coating has a coefficient of thermal expansion within the range of 7.3 to $6.1 \times 10^{-6}$ inches/inch/°C., and may be utilized as a seal in a sodium-sulfur cell.

Comparison tests were conducted on one type of glass for making seals of alpha-alumina to beta-alumina utilizing a sealing glass which is described in detail in U.S. Pat. application Ser. No. 099,597, assigned to the same assignee as the present application and consisting of 8 weight percent silicon dioxide, 45 weight percent boron oxide, 19 weight percent alumina, 6 weight percent calcium oxide, 10 weight percent strontium oxide, and 12 weight percent barium oxide, with a sealing glass, which is glass composition #3 as described in Column 3, line 43, of the Mitoff patent. Seals utilizing the sealing glass disclosed in U.S. Pat. application Ser.

No. 099,597, showed enhanced seal properties free of cracking as compared with seals made with sealing glass composition #3 described in the Mitoff patent. Very rapid diffusion of barium from Mitoff glass composition #3 into beta-alumina and of sodium in the opposite direction in exchange for barium resulting in devitrification in the glass was identified as one of the major factors for the superiority of the sealing glass in U.S. Pat. application Ser. No. 099,597. In comparison to Mitoff patent, sealing glass of U.S. Pat. application Ser. No. 099,597 glass has smaller amounts of the three alkali earth oxides (calcium oxide, strontium oxide, and barium oxide) instead of just barium oxide and calcium oxide or barium oxide as modifying oxides. This modification was significant in reducing inter-diffusion of these elements and sodium because of the reduced concentration gradients at the glass/beta-alumina interface.

Detailed studies demonstrated that beta and beta''-alumina have similar thermal expansion coefficients. The major difference between beta and beta'' with respect to ion diffusion is the more rapid diffusion by calcium, strontium and barium from the glass seal into beta''-alumina and of sodium in the opposite direction. Such diffusion has been found to be about ten times faster in beta''-alumina than in beta-alumina. Thus, to provide seals exhibiting superior sealing qualities as displayed by the sealing glasses of the present invention, it is necessary to combine calcium oxide, strontium oxide, and barium oxide in careful proportions with sodium oxide.

Neither the preferred coating composition, the additional glass coatings recited, nor the coating composition claimed in the Mitoff patent disclose as a component thereof strontium oxide. More importantly, the relationship of the oxides of calcium, strontium and barium with sodium oxide in a glass seal composition is neither taught nor recognized by the Mitoff patent. The specific composition of these oxides is now recognized as an important and innovative discovery in glass seal compositions for use as seals in sodium-sulfur cells. More specifically, it is now known that the glass compositions of the present invention exhibit superior resistance to ionic interdiffusion and devitrification which leads to early cell failure. This results from the incorporation of specific amounts of the oxides of calcium, strontium and barium with sodium oxide.

The glass compositions, in addition to the oxides of calcium, strontium, barium and sodium, contain additional components within specified ranges as shown in Table 1:

TABLE 1

Sealing Glass For Ceramic-to-Ceramic Seals
In Na—S Cells (All Compositions Are in Weight %)

| | COMPOSITIONS | | | |
|---|---|---|---|---|
| | I | II | III | Composition Range |
| $SiO_2$ | 46 | 44 | 46 | 36–50 |
| $B_2O_3$ | 25 | 30 | 26 | 15–35 |
| $Al_2O_3$ | 10 | 8 | 10 | 5–20 |
| CaO | 3 | 3 | 3 | 2–8 |
| SrO | 6 | 4 | 5 | 2–8 |
| BaO | 6 | 4 | 5 | 2–8 |
| $Na_2O$ | 4 | 4 | 4 | 2–6 |
| $Li_2O$ | — | 1 | 1 | 0–4 |
| MgO | — | 2 | — | 0–5 |

The glasses within the range given in Table 1 are new glass compositions and have the following important features: First, the glass compositions of the present invention exhibit thermal expansion coefficients at 25°–300° C. within the range of $5.2$–$6.4 \times 10^{-6}$ inches/inch/°C., which is slightly lower than that of alpha-alumina and beta''-alumina interface. Secondly, the glasses have several percent built-in-$Na_2O$ to reduce the concentration gradient of sodium at the glass/beta''-alumina interface. This in turn will suppress ionic inter-diffusion of sodium and other ions which exchange with sodium. Thirdly, small amounts of lithium oxide and/or magnesium oxide acting as stabilizers can be added to suppress the outward diffusion of Li/Mg from beta''-alumina into the glass. Fourthly, alkali earth oxides of calcium oxide, strontium oxide and barium oxide are incorporated to maintain compatible thermal expansions between the glass and the several alumina components. However, they are kept to a minimum level to suppress their ionic diffusion into beta''-alumina.

In addition silicon dioxide is added within a specific range to enhance stability of the glass against devitrification and minimize unfavorable side effects. Chemical durability against sodium attack decreases and the sealing temperature increases with increasing amounts of silicon dioxide. A higher sealing temperature in turn induces more severe ionic diffusion resulting in more compositional changes and thermal expansion mismatches in the seal.

We found that we could form sodium resistant borosilicate sealing glasses which comprise 36 to 50 weight percent silicon dioxide, 15 to 35 weight percent boron oxide, 5 to 20 weight percent alumina, 2 to 8 weight percent calcium oxide, 2 to 8 weight percent strontium oxide, 2 to 8 weight percent barium oxide, 2 to 6 weight percent sodium oxide, 0 to 4 weight percent lithium oxide, and 0 to 5 weight percent of magnesium oxide. The resulting sealing glasses have improved sodium resistant properties and glass stability. We found further that these sealing glasses had thermal expansion coefficients which are compatible with that of both beta-aluminas and alpha-alumina, which are employed generally as the ion-conductive tube and the electrically insulating flange in a sodium-sulfur battery, respectively. We provide three preferred sodium resistant borosilicate sealing glasses within the composition range of our sealing glasses. The first sealing glass designated by Roman Numeral I in Table 1, consisted of 46 weight percent silicon dioxide, 25 weight percent boron oxide, 10 weight percent alumina, 3 weight percent calcium oxide, 6 weight percent strontium oxide, 6 weight percent barium oxide, and 4 weight percent sodium oxide. The second sealing glass designated by Roman Numeral II in Table 1, consist of 44 weight percent silicon dioxide, 30 weight percent boron oxide, 8 weight percent alumina, 3 weight percent calcium oxide, 4 weight percent strontium oxide, 4 weight percent barium oxide, 4 weight percent sodium oxide, 1 weight percent lithium oxide, and 2 weight percent magnesium oxide. The third sealing glass designated by Roman Numeral III in Table 1, consist of 46 weight percent silicon dioxide, 26 weight percent boron oxide, 10 weight percent alumina, 3 weight percent calcium oxide, 5 weight percent strontium oxide, 5 weight percent barium oxide, 4 weight percent sodium oxide, and 1 weight percent lithium oxide.

The sodium stability of our sealing glass compositions was clearly demonstrated in accelerated tests with virgin glasses held at 350° C. for 7 days. These seals are not only free of cracking in the as-sealed state but also after extensive thermal cycling. In the thermal cycling tests the seals were placed in a preset furnace, kept at the testing temperature for an hour to reach equilibrium and then were taken out to air for rapid cooling. The cycling was made between the ambient temperature and 315° and 400° C., respectively, and was repeated 8 times for each temperature interval on the same samples. This thermal cycling is much more rapid than what would be encountered in actual cell testing. In all these tests none of the tests seals developed cracks.

A second significant property of our sodium resistant borosilicate sealing glasses is the stability of the glass and its resistance to devitrification. That is, the sealing glasses must be able to withstand slight changes in composition without crystallizing. The temperatures involved in the sealing operation enable ionic diffusion and even some dissolution to occur. If the local composition of the sealing glasses is altered sufficiently during the sealing operation, crystallites may form in the glass adjacent beta"-alumina which, because of thermal expansion mismatch may lead to fracture in the sealing area. Such a process would cause the sodium-sulfur cell to fail. We have provided glass stability thereby increasing its resistance to devitrification by the incorporation of specific mixtures of modifying alkali and alkali earth oxides in the glass composition. The specific mixture of 6 to 16 weight percent of these modifying oxides is 2 to 8 weight percent calcium oxide, 2 to 8 weight percent barium oxide, 2 to 8 weight percent strontium oxide and 2 to 6 weight percent sodium oxide. The inclusion of these specific mixtures of modifying alkali earth oxides insures that the glass composition remains in the glass forming region despite slight changes in composition during the sealing operation. Additionally, the thermal expansion coefficients of our sealing glasses are purposely made slightly lower than the coefficients of the various aluminas so as to make strain-free seals.

Our sodium resistant borosilicate sealing glasses are also thermally compatible with various borosilicate glasses and a wide variety of metals, such as Kovar alloy, molybdenum, etc., developed for ceramic-to-metal seals.

In the preparation of our sodium resistant borosilicate sealing glasses, we mix together the chemicals which on melting, decompose and react to yield 36 to 50 weight percent silicon dioxide, 15 to 35 weight percent boron oxide, 5 to 20 weight percent alumina, 2 to 8 weight percent calcium oxide, 2 to 8 weight percent strontium oxide, 2 to 8 weight percent barium oxide, 2 to 6 weight percent sodium oxide, 0 to 4 weight percent lithium oxide and 0 to 5 weight percent magnesium oxide. The mixed batches are then melted in an air atmosphere at a temperature in a range from 1000° C. to 1300° C. The molten glasses are poured into molds to form the glasses in convenient shapes such as blocks. The glasses are then cooled to room temperature to provide the sodium resistant borosilicate sealing glasses of our invention.

When sealing glasses of our invention are used for sealing together two components, for example, the flange and the outer wall of an ion-conductive tube in a sodium-sulfur battery, the glass is ground to reduce the above glass block to small particle size. A flange or ring of alpha-alumina is positioned around and adjacent the open end of the ion-conductive electrolyte type of beta"-alumina. The flange has a lower inner portion which abuts against the outer wall of the tube while the inner, upper portion of the flange is recessed. The flange and tube are held in position by a suitable fixture to form an assembly. The glass particles of the sealing glass are positioned in the recess between the outer surface of the tube and the upper portion of the adjacent flange. The tube and flange with the particles positioned therebetween as above described, are then heated to a temperature of about 1100° C. in an air atmosphere to melt the glass particles. The assembly is then cooled to room temperature with a resulting sodium resistant borosilicate sealing glass sealing the flange to the outer wall of the tube. A sodium-sulfur cell is then constructed in accordance, for example, with the above mentioned U.S. Pat. No. 3,946,751.

Examples of our sodium resistant borosilicate sealing glass made in accordance with our invention are set forth below:

EXAMPLE I

A sodium resistant borosilicate sealing glass is formed by mixing together the chemicals which on melting, decomposing and reacting yield a glass with the composition of 46 weight percent silicon dioxide, 25 weight percent boron oxide, 10 weight percent alumina, 3 weight percent calcium oxide, 6 weight percent strontium oxide, 6 weight percent barium oxide, and 4 weight percent sodium oxide. This mixed batch is heated to a temperature of 1200° C. in an air atmosphere to provide molten glass. The molten glass is poured into a block-shaped mold and allowed to cool. The resulting block is a sodium resistant borosilicate sealing glass made in accordance with our invention.

EXAMPLE II

A sodium resistant borosilicate sealing glass is formed by mixing together the chemicals which on melting decomposing and reacting yield a glass with the composition to 44 weight percent silicon dioxide, 30 weight percent boron oxide, 8 weight percent alumina, 3 weight percent calcium oxide, 4 weight percent strontium oxide, 4 weight percent barium oxide, 4 weight percent sodium oxide, 1 weight percent lithium oxide, and 2 weight percent magnesium oxide. This mixed batch is heated to a temperature of 1200° C. in an air atmosphere to provide molten glass. The molten glass is poured into a block shaped mold and allowed to cool. The resultant block is a sodium resistant borosilicate sealing glass made in accordance with the invention.

EXAMPLE III

A sodium resistant borosilicate sealing glass is formed by mixing together the chemicals which on melting, decomposing and reacting yield a glass with the composition of 46 weight percent silicon dioxide, 26 weight percent boron oxide, 10 weight percent alumina, 3 weight percent calcium oxide, 5 weight percent strontium oxide, 5 weight percent barium oxide, 4 weight percent sodium oxide, and 1 weight percent lithium oxide.

EXAMPLE IV

Blocks of sodium resistant borosilicate sealing glass were prepared in accordance with Example I. These blocks were ground to a small particle size. Thirty sodium beta"-ion-conductive tubes were each provided with an alpha-alumina flange around its outer surface and adjacent its open end. Each flange had a lower portion which abutted the outer wall of the respective tubes while the upper portion provided a recess between the outer wall of the tube and the flange. Sealing glass particles were positioned in each of these recesses.

Each tube and its associated flange with sealing glass particles was held in position by a fixture to provide an assembly. Each assembly was heated to a temperature of 1100° C. in an air atmosphere after which it was cooled to room temperature resulting in a sodium resistant borosilicate sealing glass seal between the exterior wall of the tube and the inner surface of the flange.

EXAMPLE V

Laboratory sodium-sulfur cell batteries utilizing the borosilicate glass seals of Example I between alpha-alumina and beta"-alumina interface were electrochemically cycled at 315° C. for 36 days. Upon disassembly and examination, the borosilicate glass seals did not exhibit cracking.

EXAMPLE VI

Ten alpha-alumina to beta"-alumina seals using the borosilicate sealing glass of Example I and utilized according to Example IV, were thermally cycled by placing them in a preset furnace for an hour until equilibrium was obtained at which time the samples were removed for air cooling to ambient temperature. The cycling was conducted from the ambient temperature to 315° C. and 400° C., respectively, and was repeated 8 times for each temperature interval on each sample. This thermal cycling is much more rapid than normally encountered in actual cell testing. None of the seals thus tested exhibited cracking which would have caused cell failure.

While other modifications of the invention and variations thereof which may be employed within the scope of the invention have not been described, the invention is intended to include such as may be embraced within the following claims:

What we claim as new and desire to secure by Letters Patent of the United States is:

1. Sodium resistant borosilicate sealing glasses consisting essentially of 36 to 50 weight percent silicon dioxide, 15 to 35 weight percent boron oxide, 5 to 20 weight percent alumina, 6 to 16 weight percent of mixtures of alkali oxides of 2 to 8 weight percent calcium oxide, 2 to 8 weight barium oxide, 2 to 8 weight percent strontium oxide, 2 to 6 weight percent sodium oxide, 0 to 4 weight percent lithium oxide, and 0 to 5 weight percent magnesium oxide.

2. A sodium resistant borosilicate sealing glass consisting of 46 weight percent silicon dioxide, 25 weight percent boron oxide, 10 weight percent alumina, 3 weight percent calcium oxide, 6 weight percent strontium oxide, 6 weight percent barium oxide, and 4 weight percent sodium oxide.

3. A sodium resistant borosilicate sealing glass consisting of 44 weight percent silicon dioxide, 30 weight percent boron oxide, 8 weight percent alumina, 3 weight percent calcium oxide, 4 weight percent strontium oxide, 4 weight percent barium oxide, 4 weight percent sodium oxide, 1 weight percent lithium oxide, and 2 weight percent magnesium oxide.

4. A sodium resistant borosilicate sealing glass consisting of 46 weight percent silicon dioxide, 26 weight percent boron oxide, 10 weight percent alumina, 3 weight percent calcium oxide, 5 weight percent strontium oxide, 5 weight percent barium oxide, 4 weight percent sodium oxide, and 1 weight percent lithium oxide.

* * * * *